(12) United States Patent
Oh (10) Patent No.: US 10,318,577 B2
(45) Date of Patent: Jun. 11, 2019

(54) METHOD FOR IDENTIFYING USER'S NEEDS BASED ON IMAGE WORD INTERPRETATION

(71) Applicant: Perception, Seoul (KR)

(72) Inventor: Kisuk Oh, Seoul (KR)

(73) Assignee: PERCEPTION, Seoul (KR)

( * ) Notice: Subject to any disclaimer, the term of this patent is extended or adjusted under 35 U.S.C. 154(b) by 1010 days.

(21) Appl. No.: 14/690,437

(22) Filed: Apr. 19, 2015

(65) Prior Publication Data

US 2016/0196285 A1 Jul. 7, 2016

(30) Foreign Application Priority Data

Jan. 6, 2015 (KR) ........................ 10-2015-0001021

(51) Int. Cl.
*G06F 7/00* (2006.01)
*G06F 16/58* (2019.01)

(52) U.S. Cl.
CPC ................................ *G06F 16/5866* (2019.01)

(58) Field of Classification Search
USPC ........................................................ 707/706
See application file for complete search history.

(56) References Cited

U.S. PATENT DOCUMENTS

2003/0220913 A1* 11/2003 Doganata .......... G06F 17/30867
2011/0305395 A1* 12/2011 Takayama ............ G11B 27/034
382/190
2014/0089000 A1* 3/2014 Takata .................. G06F 19/321
705/2

FOREIGN PATENT DOCUMENTS

KR 10-2007-0105722 10/2007
KR 10-2014-0119217 10/2014

* cited by examiner

*Primary Examiner* — Tony Mahmoudi
*Assistant Examiner* — Muluemebet Gurmu
(74) *Attorney, Agent, or Firm* — Saliwanchik, Lloyd & Eisenschenk (57) ABSTRACT

A method for identifying a need of a user based on an image word interpretation, the method comprising: assigning prime keywords and style keywords to a plurality of images, wherein the images having the prime and style keywords assigned thereto are stored by at least one image category of the images; receiving a target keyword from the user depending on a need of a user; displaying images within the at least one image category, and receiving a preferred image by the at least one category from the user; extracting a target image that matches the target keyword based on the received preferred image; and displaying the extracted target image in accordance with at least one way.

6 Claims, 6 Drawing Sheets

|  | TOP 5 STYLE BOARD | | | | |
|---|---|---|---|---|---|
| REPRESENTATIVE KEYWORD | W | W | W | W | W |
| SIMILAR TO STYLE SCORE | W | W | W | Y | B |
| SIMILAR TO PRIME SCORE |  |  |  |  |  |

FIG.6

METHOD FOR IDENTIFYING USER'S NEEDS BASED ON IMAGE WORD INTERPRETATION

RELATED APPLICATIONS

This application is based on and claims priority to Korean Patent Application No. 10-2015-0001021, filed on Jan. 6, 2015, the contents of which are incorporated herein in its entirety by reference.

FIELD OF THE INVENTION

The present disclosure relates to a method for identifying a need of a user based on an image word interpretation, and more particular, to a method for providing a user with a desired image in a way that significantly reduces an error between a word selected by the user and an image associated with the word.

BACKGROUND OF THE INVENTION

In recent, researches have been actively carried out on search engines to search for images that users are looking for. In addition to a search for images that users are looking for, researches have also been carried out on error control as to whether the intentions of the users are fully reflected on the images to be searched. One of methods for searching images with user's intention reflected thereon may be carried out in a way that automatically generates a list of candidate images which may be utilized in making an initial query for an image search. An example of the above-mentioned method is disclosed in Korean Patent Laid-Open Publication No. 2007-0105722, entitled "Automatic Generation Method of the Initial Query Set for Image Search on the Mobile Web," laid-open on Oct. 31, 2007, which includes: automatically generating a set of initial queries on which a user's preference is reflected using fed-back image relevance information; creating a user profile based on the relevance information; a group of neighbors having a taste similar to the user's preference; and recommending an item that is preferred by the group of neighbors.

However, it is not possible to satisfy fully the need of a user, since the group of neighbors who have a similar taste may have different preferences from the user. In addition, errors between words selected by individual users and associated images may be different from everyone. Therefore, it is needed to calibrate an error between an image intended by a user and a word selected by the user.

SUMMARY OF THE INVENTION

In view of the above, the present disclosure provides a method for identifying a need of a user in a way that maps prime keywords and style keywords to a plurality of images; performs a degree of confidence and a rating of the mapped keywords through a survey of the mapped keywords to build a database of the images; calibrating an error between an image that is intended by the user and a word selected by the user to identify an intention of the user; displaying a target image that the user is looking for, which corresponds with a target keyword, through the use of a preference image selected by the user. It will be, however, apparently understood by those skilled in the art from the following description that the technical subject of the present disclosure is not limited to the foregoing technical subject, and there may be other technical subjects that are not described above.

In accordance with an embodiment of the present disclosure, there is provided a method for identifying a need of a user based on an image word interpretation, the method comprising: assigning prime keywords and style keywords to a plurality of images, wherein the images having the prime and style keywords assigned thereto are stored by at least one image category of the images; receiving a target keyword from the user depending on a need of a user; displaying images within the at least one image category, and receiving a preferred image by the at least one category from the user; extracting a target image that matches the target keyword based on the received preferred image; and displaying the extracted target image in accordance with at least one way.

In the embodiment, a prime keyword is a keyword having a pair of opposite image words with respect to an image; and a style keyword is an image word which is indicative of a style of an image.

In the embodiment, said assigning prime keywords and style keywords to a plurality of images comprises: collecting the prime and style keywords with respect to the plurality of images from a number of users; applying data weights to the received prime and style keywords by survey groups; determining a confidence interval using a weighted mean and a standard deviation for the weighted prime and style keywords; and assigning the prime keywords and the style keywords with respect to the plurality of images by removing the prime keywords and the style keywords beyond the confidence interval.

In the embodiment, the method further comprising: after said assigning prime keyword and style keyword to a plurality of images, extracting associated images within an error range of scores on the weighted prime and style keywords depending on the scores.

In the embodiment, the method further comprising: before said receiving a target keyword from the user depending on a need of a user, displaying a test image; receiving a prime keyword for the displayed test image from the user; and detecting an error between a pre-stored prime keyword in the test image and a prime keyword provided from the user.

In the embodiment, the method further comprising: after said displaying images within the at least one image category, and receiving a preferred image by the at least one category from the user, calculating a mean combination of a combination of prime keywords for a number of images that belong to the at least one category; calculating a mean range for prime keywords of images included in the mean combination; removing images beyond the calculated mean range from the images included in the mean combination; and selecting a predetermined number of images from remaining images except the removed images.

In the embodiment, said displaying the extracted target image in accordance with at least one way comprises: extracting style keywords that are mapped to the mean combination; and extracting an image that has a style keyword similar to the extracted style keywords and matches the target keyword received from the user.

In the embodiment, said displaying the extracted target image in according to at least one way comprises: selecting a style keyword with a largest ratio among the style keywords that are mapped to the mean combination; and extracting an image that is mapped to the selected style keyword and matches the target keyword received from the user.

In the embodiment, said displaying the extracted target image in according to at least one way comprises: calculating ratios of style keywords that are mapped to the mean combination; and extracting an image that matches the target keyword received from the user in order of the ratios of the style keywords.

In the embodiment, said displaying the extracted target image in according to at least one way comprises: selecting prime keywords that are mapped to the mean combination; and extracting an image that has a prime score within a predetermined range of scores on the selected prime keywords and matches the target keyword received from the user.

As described above, in accordance with any one of solutions to the aforementioned subject of the present disclosure, it is possible to correctly provide an image that the user is looking for by minimizing an error between the image intended by the user and the word selected by the user.

BRIEF DESCRIPTION OF THE DRAWINGS

The above and other objects and features of the present disclosure will become apparent from the following description of the embodiments given in conjunction with the accompanying drawings, in which.

DETAILED DESCRIPTION OF THE EMBODIMENTS

Hereinafter, embodiments of the present disclosure will be described in detail with reference to the accompanying drawings so that those skilled in the art can readily implement them. The present disclosure, however, may be implemented in different forms, and it is not limited thereto. In the drawings, further, portions unrelated to the description of the present disclosure will be omitted for clarity of the description, and like reference numerals and like components refer to like elements throughout the detailed description.

In the entire specification, when a portion is "connected" to another portion, it means that the portions are not only "connected directly" with each other but they are electrically connected" with each other by way of another device therebetween. Further, when a portion "comprises" a component, it means that the portion does not exclude another component but further comprises other component unless otherwise described. Furthermore, it should be understood that one or more other features or numerals, steps, operations, components, parts or their combinations can be or are not excluded beforehand.

Hereinafter, the embodiments of the present disclosure will be described in detail with reference to the accompanying drawings.

Figure 1:
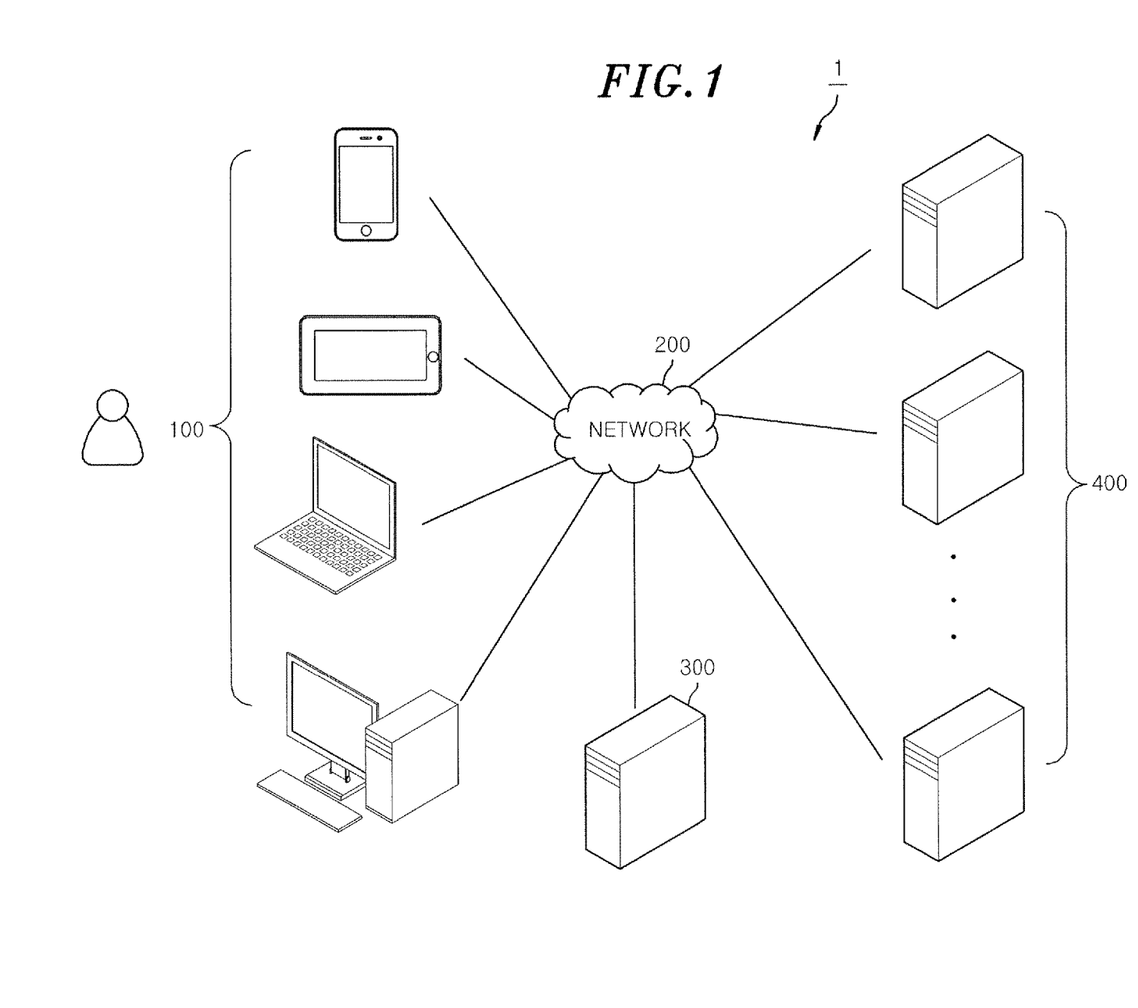
FIG. 1 is a block diagram of a system for identifying a need of a user on an image word interpretation in accordance with an embodiment of the present disclosure.

FIG. 1 is a block diagram of a system for identifying a need of a user based on an image word interpretation in accordance with embodiment of the present disclosure. Referring to FIG. 1, a system 1 for identifying a user's need may include a user device 100, a server 300 for identifying a user's need, and at least one server 400. However, it should be understood that the system 1 is merely an example of the present disclosure and the present disclosure is not construed to be limited to the example of FIG. 1.

The components illustrated in FIG. 1 are generally connected one another through a network 200. For example, as illustrated in FIG. 1, the user device 100 and the user's need identifying server 300 may be connected each other through the network 200. Further, the user's need identifying server 300 may be connected to the at least one server 400 through the network 200.

In the embodiment of the present disclosure, it may be possible to remove the user's need identifying server 300 and the at least one server 400 from the embodiment of the present disclosure. In other words, in case where the user device 100 in itself is capable of performing a method for identifying a need of a user, both the user's need identifying server 300 and the at least one server 400 are not required in this embodiment. However, in the embodiment of the present disclosure, a description will be made on the assumption that the user device 100 is configured to receive a selection from a user through a user interface, the user's need identifying server 300 is configured to collect images via the at least one server 400 to build a database of the images and send a result to the user device 100 upon receiving a selection from the user device 100. Further, the present disclosure may comprise an example in which the user device 100 can accomplish operations to be carried out by the user's need identifying server 300, unless specifically noted otherwise in the following description.

The user device 100 may be a device that receives a test image from the user's need identifying server 300 and transmit a prime keyword to the received test images as its response. The prime keyword may be, for example, a pair of opposite words with respect to an image. For example, the prime keyword may include a Modern-Classic pair, a Soft-Hard pair, a Light-Heavy pair, a Static-Dynamic pair, a Simple-Complex pair, a Luxury-Normal pair, or the like. In this connection, one image may have at least one prime keyword. For example, an image may be assigned a prime keyword such as a combination of words of modern, heavy, dynamic, complex, normal, etc. Furthermore, in addition to the selection of any one of opposite words in pairs, a prime keyword may be given a rating, for example, such as a modern 60% and a classic 40%. Further, the user device 100 may be capable of receiving a plurality of images by categories from the user's need identifying server 300, selecting a preference image from the plural images by categories, and then sending the selected image to the user's need identifying server 300. Furthermore, the user device 100 may transmit a target keyword corresponding to an image word that the user wants to the user's need identifying server 300 and may display a target image that is matched to the image word on a screen. The user device 100 may be implemented by a device that may connect to servers or other devices at a remote location through the network 200. In this case, the user device 100 may be implemented by a computer that may connect to servers or devices at a remote location through the network 200. Here, the computer may include, for example, a notebook computer, desktop computer, laptop computer or the like. Further, the user device 100 may be implemented by a device that may be connected with servers or devices at a remote location through the network 200. The user device 100 may be a wireless communication device that ensures portability and mobility, for example, which may include any type of handheld-based wireless communication device such as a handset for PCS (Personal Communication System), GSM (Global System for Mobile communication), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet), or Smartphone, Smartpad, Tablet PC, or the like.

The user's need identifying server 300 may be any server that assigns prime keywords and style keywords to a plurality of images and builds a database of the images by categories. A style keyword used herein may be a keyword, for example, such as Chic, Casual, Natural, Sexy, Romantic, etc. Further, the user's need identifying server 300 may collect data on the prime keywords and the style keywords with respect to a plurality of images provided from one or more expert's devices (not shown) and may measure a standard deviation and a degree of confidence for assigned keywords. As a result, the user's need identifying server 300 may build a database of the plurality of images having the prime keywords and the style keywords assigned thereto. The object of collect data on the prime and style keywords from the experts is to perform standardization on words associated with an image that the users look by measuring a standard deviation and a degree of confidence for the associated words because each of the users may individually bring a different image word to his/her mind when he/her looks an image. Further, the user's need identifying server 300 may transmit a test image to the user device 100 and receives a prime keyword as a response thereto from the user device 100. By doing so, the user's need identifying server 300 may identify which word is associated with the plurality of images by the user. For example, in case where there is a photo image of a sunny spring day, a prime keyword selected by a user who looks at the photo image may be different from a prime keyword retrieved from a database of the photo image. The degree of the difference between them may help determine an error between an image word thought by the user and an image to which the corresponding image word is reflected. For example, there may occur a situation where although a user says that he/her wants "a modern advertisement", the user may actually think of a "classic" image rather than a "modern" image as the "modern" image. Therefore, an image test may be carried out in an attempt to identify the error between the image thought by the user and the word actually selected by the user. In addition, the user's need identifying server 300 may receive a target keyword based on the need of a user from the user. The user's need identifying server 300 may receive an input value to be used to select an image that the user wants. For example, in case where a user wants to make an advertisement for sneakers with a "dynamic" image, a word "dynamic" may become a target keyword. The user's need identifying server 300 may then receive a preference image, which is selected by the user among a plurality of images included in at least one category, from the user device 100. In other words, the user's need identifying server 300 may primarily identify which kind of atmosphere of image is preferred by the user using the keyword received from the user and secondarily identify a preference of the user on which of images matching the keyword is preferred by the user. After that, the user's need identifying server 300 may calculate a mean combination and a mean range of the prime keywords that are mapped to the preference image and perform a filtering procedure to remove images out of the calculated mean combination and mean range, thereby identifying exactly need of a user. In addition, the user's need identifying server 300 may transmit to the user device 100 a target image matching the target keyword in accordance with four different ways. In this regard, the user's need identifying server 300 may be implemented by a computer device that may connect to servers or devices at a remote location through the network 200. Here, the computer device may include, for example, a notebook computer, desktop computer, laptop computer or the like. Further, the user's need identifying server 300 may be implemented by a device that may connect to servers or devices at a remote location through the network 200.

The at least one server 400 may be any one of servers that transmit a plurality of images to the user's need identifying server 300. The at least one server 400 may be a server that maps the prime keywords and the style keywords for a plurality of images for the transmission thereof.

Figure 2:
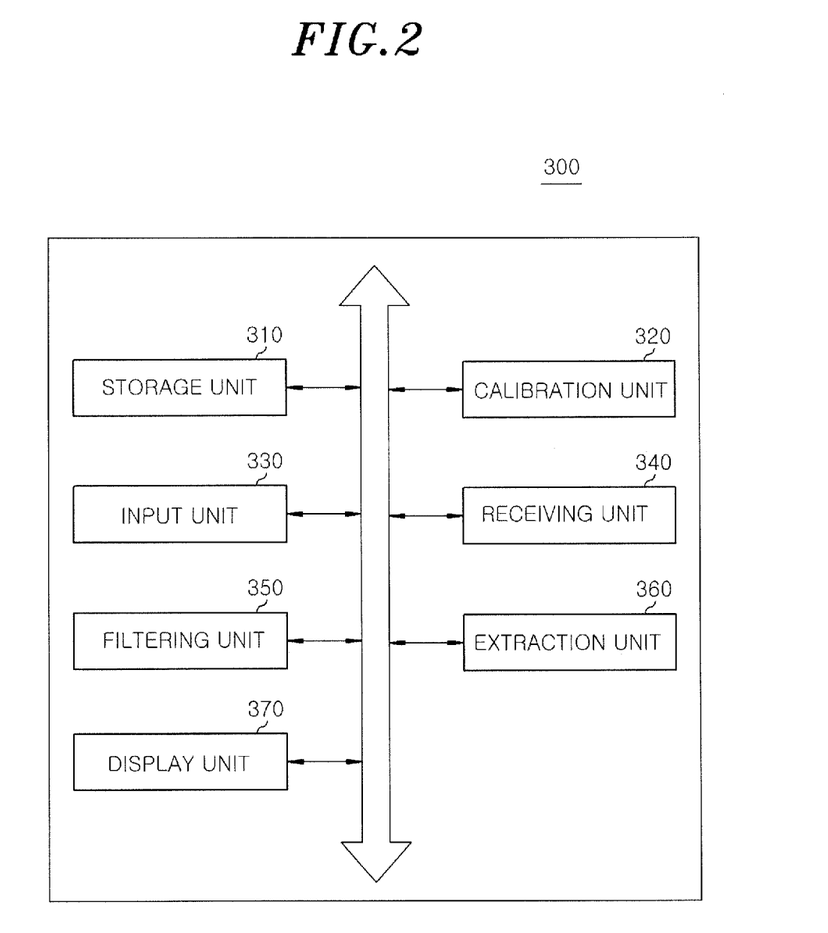
FIG. 2 is a block diagram of a server for identifying a user's need, which is shown in FIG. 1.
Figure 3A:
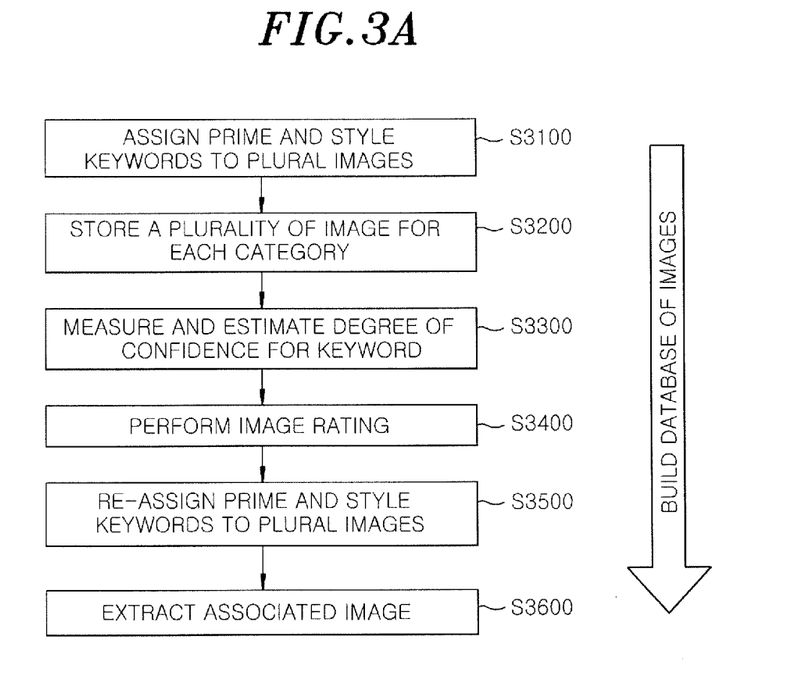
FIGS. 3A and 3B are illustrations describing a process of building a database of images by means of the a server for identifying a user's need, which is shown in FIG. 1.
Figure 3B:
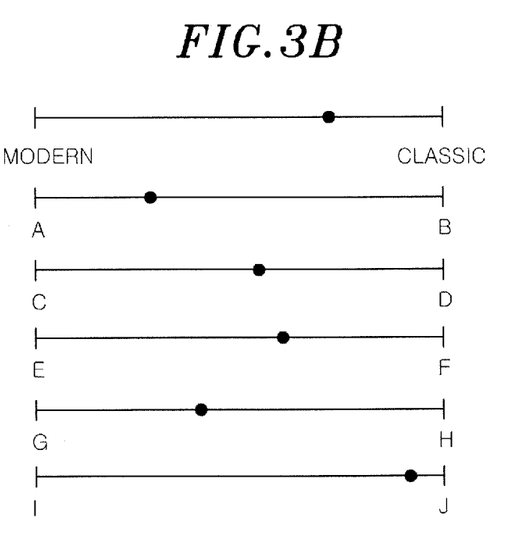
Figure 4:
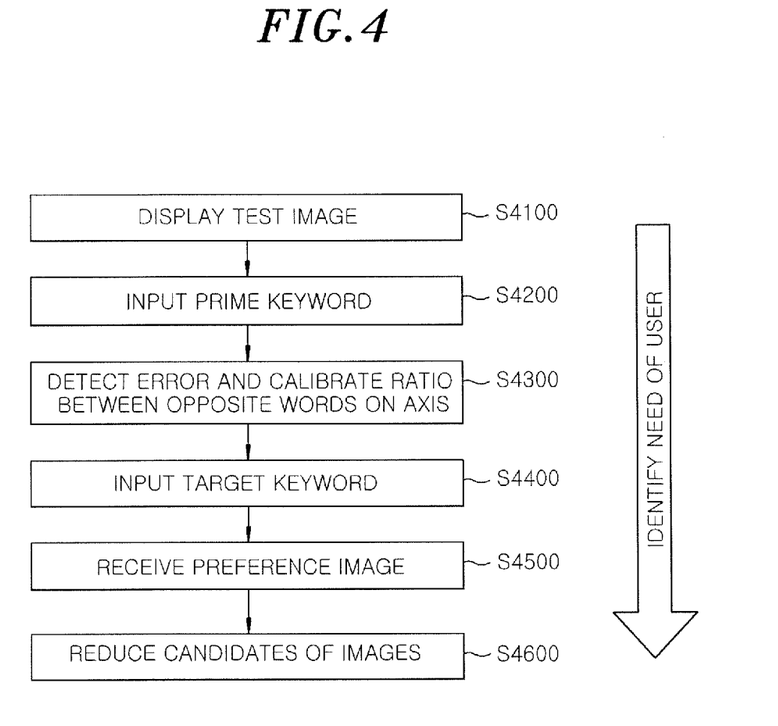
FIG. 4 is an illustration describing a process of identifying a user's need by means of the a server for identifying a user's need, which is shown in FIG. 1.
Figure 5A:
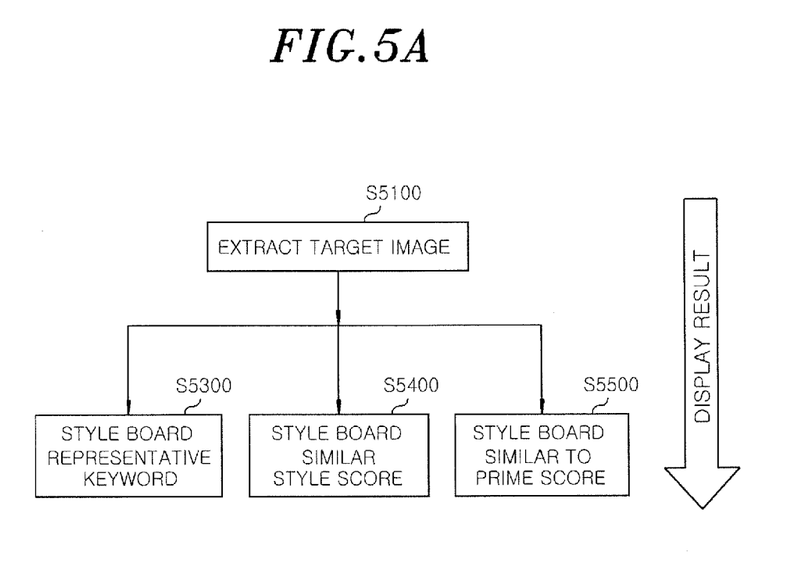
FIGS. 5A and 5B are illustrations describing the result produced from the server for identifying a user's need, which is shown in FIG. 1.
Figure 5B:
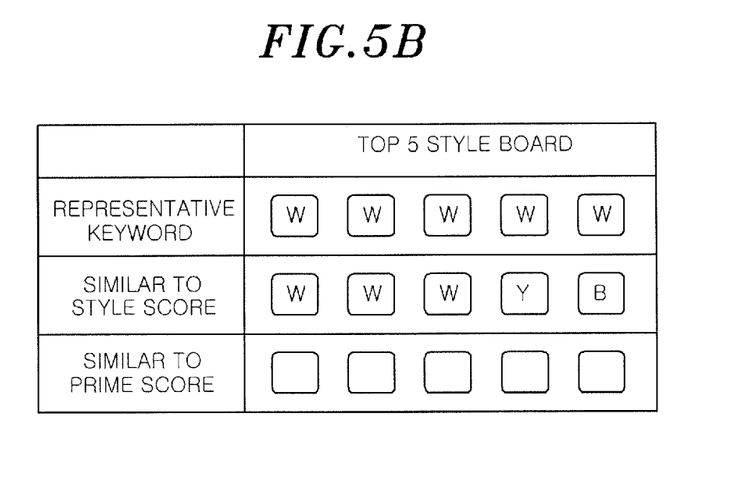

FIG. 2 is a block diagram of the user's need identifying server shown in FIG. 1; FIGS. 3A and 3B are illustrations describing a process of building a database of images by means of the user's need identifying server shown in FIG. 1; FIG. 4 is an illustration describing a process of identifying the user's need by the user's need identifying server shown in FIG. 1; and FIGS. 5A and 5B are illustrations describing the results produced from the user's need identifying server shown in FIG. 1.

Referring now to FIG. 2, the user's need identifying server 300 may include a storage unit 310, a calibration unit 320, an input unit 330, a receiving unit 340, a filtering unit 350, an extraction unit 360, and a display unit 370.

In accordance with the embodiment of the present disclosure, the user's need identifying server 300 that is interworked with the user device 100 or another server (not shown) that is interworked with the user's need identifying server 300 may install or open an application, program or web page for identifying a need of a user based on an image word interpretation. Further, a program for identifying a need of a user based on image word interpretation may be driven in the user device 100 using a script running in a web browser. Here, the web browser refers to a program that enables the user device to use a web (WWW: World Wide Web) service, which means a program that receives and shows a hypertext scripted in HTML (Hyper Text Mark-up Language), and may include Netscape, Explorer and Chrome, for example. Further, the application means an application program on a device, for example, including an application program (app.) executed on a mobile device (e.g., a smart phone). The app. may be installed by downloading it from a mobile application market being a virtual market where mobile contents are freely dealt in.

In addition, the connection to the network 200 means an interconnection among the user device 100, the user's need identifying server 300, and the at least one server 400 so that they can be in communication with one another. Further, the establishment of the connection to the network 200 means that the user's need identifying server 300 generates a communication entity at a communication connection point and it communicates with devices that are connected through the network 200. The user's need identifying server 300 may exchange data with the devices through the communication entity.

Hereinafter, the method for identifying a need of a user will be described step-by-step, which is generally divided into three phases, in accordance with the embodiment of the present disclosure. The method for identifying a need of a user includes operations of building a database of images, identifying a user's need, and displaying a result. An operation of building a database of images will be discussed with reference to FIGS. 2 to 3B, an operation of identifying a user's need will be discussed with reference to FIGS. 2 and 4; and an operation of displaying a result will be discussed with reference to FIGS. 2 and 5.

Referring now to FIGS. 2 and 3A, prime keywords and style keywords are assigned to a plurality of images and stored by categories of the images in the storage unit 310, as in blocks S3100 and S3200. It is understood that the prime keywords and the style keywords may not be limited to those mentioned above and may be modified, added or deleted. Further, a prime keyword may include a number of keywords which include pairs of opposite words, and a style keyword may include an image word indicative of a style of an image.

The calibration unit 320 measures a degree of confidence for keywords to estimate it, as in block S3300. The degree of confidence may be measured by applying data weights to the keywords by survey groups and creating a weighted mean and a standard deviation of the weighted keywords. More specifically, the calibration unit 320 may collect the prime keywords and the style keywords for the plurality of images from a number of the users, apply data weights to the prime and style keywords for the plurality of images on a survey group basis, determine a confidence interval using the weighted mean and standard deviation of the weighted prime and style keywords, and assign the prime and style keywords to the plurality of images by removing the prime and style keywords for the plurality of images that are beyond the confidence interval, and giving scores on the prime and style keywords, as in block S3400. Accordingly, it is possible to calibrate the scores on the prime keywords and the style keywords stored in the storage unit 310, and thus the calibration unit 320 may re-assign the prime and style keywords to the plurality of images, as in block S3500.

Alternatively, the calibration unit 320 may measure and evaluate a degree of confidence for the stored images. Specifically, the calibration unit 320 may apply data weights to the prime and style keywords for survey groups and measure the degree of confidence for the stored images by using a weighted mean and standard deviation of the weighted keywords, which are assigned to the respective images. More specifically, the calibration unit 320 may collect the prime keywords and style keywords for a plurality of images from a number of users, assign the prime and style keywords to the plurality of images depending on data weights and frequencies by the survey groups, collect scores on the prime keywords and style keywords assigned to the images within each category from the users, and determining the confidence interval for the stored images through the use of a mean and standard deviation of the collected scores. Some images beyond the confidence interval may then be removed from the images stored in the storage unit 310.

The input unit 330 may extract associated images within an error range of scores on the weighted prime and style keywords depending on the scores, as in block S3600.

Referring to FIG. 3B, there is illustrated six horizontal axes with opposite words at their both ends, which illustrate the prime keywords. As known from this illustration, rather than to choose any one of the opposite words in pair as a prime keyword, the prime keyword is given a score from a rating which is determined by sliding a point on a horizontal axis between the opposite words.

The operation of identifying a need of a user will be discussed with reference to FIGS. 2 and 4.

The input unit 330 may display a test image, as in block S4100 and receive scores on a prime keyword and a style keyword with respect to the test image from the user, as in block S4200. In this case, a score on the prime keyword received from the user may be, for example, a percentage (%) of the opposite image words with respect to an image. The input unit 330 may detect an error between a pre-stored prime keyword in the test image and a prime keyword inputted by the user, and calibrate the ratio between the opposite words on the horizontal axis related to the prime keyword of the image depending on the detected error, as in block S4330. Through the aforementioned process, it is possible to identify how much an image word that is selected by the user matches an image of the user that is associated with the image word.

Next, the input unit 330 may receive a target keyword corresponding to a need of a user from the user, as in block S4400. Thereafter, the receiving unit 340 may display plural images by at least one image category and receive a preference image by the at least image category from the user, as in block S4500.

The filtering unit 350 may perform a filtering process to extract a target image to be matched to the target keyword of the user based on the preference image provided from the user. More specifically, the filtering unit 350 may calculate a mean combination for a combination of prime keywords for the plurality of images that belong to at least one image category, calculate an average range of the prime keywords for the images included in the mean combination, removes some images beyond the calculated average range, and select a predetermined number of images from remaining images except the removed image.

The operation of displaying a result of the embodiment of the present disclosure will be discussed with reference to FIGS. 2 and 5.

The extraction unit 360 may extract a target image that matches the target keyword based on the received preference image, as in block S5100. According to the embodiment, four different ways may be employed to display the target image matching the target keyword: S5300 to display an image having a target keyword requested by the user; S5400 to display an image similar in a style score to an image that the user wants; and S5500 to display an image similar in a prime score to the image that the user wants.

The display unit 370 may display the extracted target image using any one of the four different ways, which will be discussed as follows.

First, as an example, it is assumed that two images for each of 25 categories, which include, for example, vehicle, fashion, shoes, spectacles, furniture, . . . , etc., a total of 50 images are selected; and the prime keyword for the selected images includes a combination of 'Modern', 'Hard', 'Heavy', 'Static', 'Simple', and 'Normal'; and the style keyword for the selected images has a ratio of a Wild 60%, a Young 30%, and a Boyish 10%.

Referring to FIG. 5B, a method of displaying a representative keyword includes selecting a style keyword having a largest ratio among style keywords that are mapped to the mean combination and extracting an image that is mapped to the selected style keyword and matches the target keyword inputted by the user.

A method of displaying an image similar in a style score to the image that the user wants includes calculating ratios of style keywords that are mapped to the mean combination and extracting an image that corresponds to a target keyword inputted by the user in order of ratios of the style keywords. Alternatively, the method may include selecting a style keyword that is mapped to the mean combination and extracting an image that matches a target keyword inputted by the user through the use of a style keyword similar to the extracted style keyword.

Lastly, a method of displaying an image similar in a prime score to an image that the user wants includes selecting prime keywords that are mapped to the mean combination and extracting an image that has a prime score within a predetermined range of the scores on the selected prime keywords and matches a target keyword inputted by the user Those not described in the method for identifying the user's needs of FIGS. 2 to 5 are identical to or may be easily inferred from the detailed description with reference to FIG. 1; and, therefore, a further description thereof will be omitted.

Figure 6:
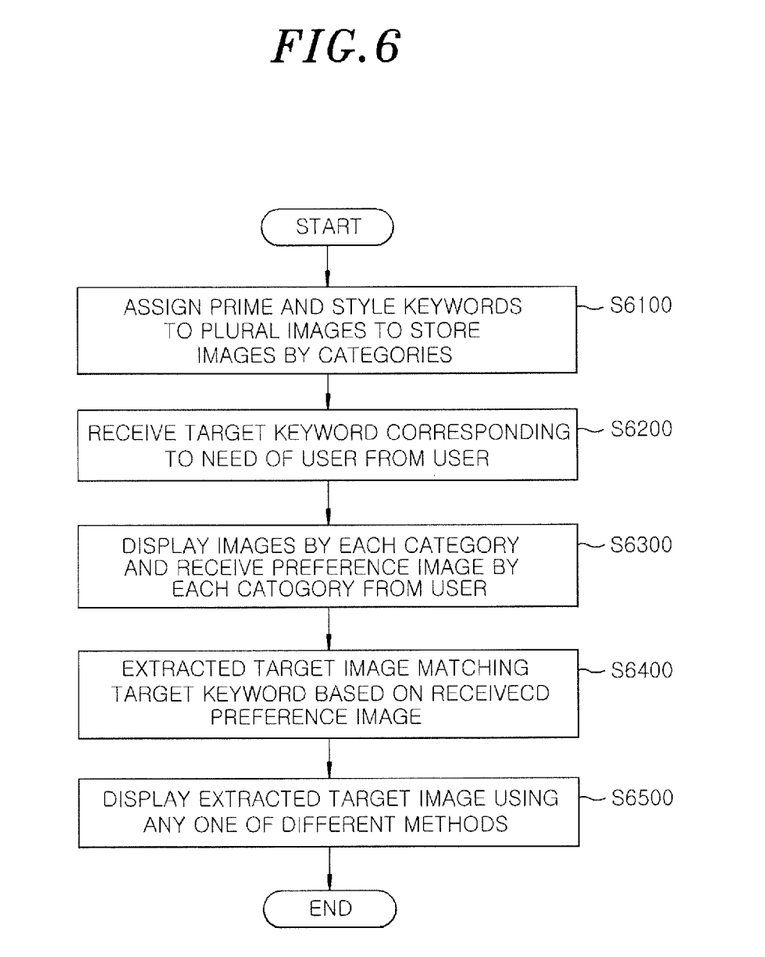
FIG. 6 is a flow diagram illustrating a system for identifying a user's need based on the image word interpretation in accordance with embodiment of the present disclosure.

FIG. 6 is a flow diagram illustrating a system for identifying a need of a user based on an image word interpretation in accordance with an embodiment of the present disclosure. Hereinafter, an example of the process that transmits and receives signals will be described with reference to FIG. 6. However, it will be appreciated by those skilled person in the art that the present disclosure is not limited to such an embodiment and the process to transmit and receive the signals as shown in FIG. 6 may be changed with various embodiments as set forth above.

Referring to FIG. 6, in block S6100, at the user's need identifying server, prime keywords and style keywords are assigned to a plurality of images and stored by categories of the images.

In block S6200, at the user's need identifying server, a target keyword is then received from the user.

In block S6300, at the user's need identifying server, images are displayed for each category and a preference image is received from the user.

In block S6400, at the user's need identifying server, a target image that matches the target keyword is extracted based on the received preference image.

Thereafter, in block S6500, the extracted target image is displayed in accordance with any one of the different methods as mentioned above. The order of the above operations described in blocks S6100 to S6500 is merely an example, which however is not limited thereto. In other words, the order of the operations described in blocks S6100 to S6500 may be mutually exchanged, and some of these operations may be simultaneously executed or partially removed.

Since items unexplained with respect to the method of identifying the user's needs as illustrated in FIG. 6 are identical to the detailed description with reference to FIG. 1 to 5 or easily inferred from the detailed description, the detailed description on the unexplained items will be omitted.

The method for identifying the user need based on the image word interpretations in accordance with embodiment of the present disclosure described with reference to FIG. 6 may be implemented in the form of recording media including instructions executable by a computer, such as applications or program modules that are executed by a computer. The computer readable media may be any available media that can be accessed by a computer and may include volatile and nonvolatile media, and removable and non-removable media. Further, the computer readable media may include any computer storage media and communication media. The computer storage media may include any volatile and non-volatile media and removable and non-removable storage media that are implemented in any methods or technologies for the storage of information such as data and computer-readable instructions, data structures, program modules, or other data. The communication media may include a transport mechanism or any information delivery media for transmitting computer readable instructions, data structures, program modules or other data of modulated data signal such as carrier waves.

At least one embodiment of the present disclosure described above according to the online game service delivery in the social network, the applications installed on the device by default (which is mounted on the device by default included in the platform or operating system may include a program) in the can be executed by the user application store server, application, or the application associated with the service provided, such as a Web server through a server application is installed directly on the device (i.e., the program) may be executed by. In this sense, the present disclosure according to the embodiment of the social network of online game service delivery to the device by default the application is installed or installed directly by the user (i.e., the program) is implemented as a computer-readable device, such as can be recorded on a recording medium.

Description of the present disclosure as mentioned above is intended for illustrative purposes, and it will be understood to those having ordinary skill in the art that this invention can be easily modified into other specific forms without changing the technical idea and the essential characteristics of the present disclosure. Accordingly, it should be understood that the embodiments described above are exemplary in all respects and not limited thereto. For example, respective components described to be one body may be implemented separately from one another, and likewise components described separately from one another may be implemented in an integrated type.

The scope of the present disclosure is represented by the claims described below rather than the foregoing detailed description, and it should be construed that all modifications or changes derived from the meaning and scope of the claims and their equivalent concepts are intended to be fallen within the scope of the present disclosure.

What is claimed is:

1. A method, performed by at least one processor, for identifying a need of a user based on an image word interpretation, the method comprising:

collecting prime keywords and style keywords with respect to a plurality of images from a number of respondents by setting, for the plurality of images, pairs of image words having opposite meanings as the prime keywords and image words, each of which is indicative of a style of a corresponding image as the style keywords;

applying data weights to the collected prime and style keywords by survey groups into which the respondents belong;

determining a confidence interval using a weighted mean and a standard deviation for weighted prime and style keywords to which the data weights are applied;

removing prime keywords and style keywords beyond the confidence interval from the collected prime and style keywords to assign the remaining prime keywords and the remaining style keywords to the plurality of images;

scoring each of the remaining prime keywords and the remaining style keywords;

classifying the images having the remaining prime keywords and the remaining style keywords assigned thereto into a plurality of image categories by extracting images associated with each other within a tolerance range on a basis of each score of the remaining prime keywords and the remaining style keywords;

receiving a target keyword from the user depending on a need of a user, displaying to the user images having at least one image for each of the plurality of the image categories, and receiving preferred images by the user among the displayed images;

extracting target images relating to the target keyword based on the selected preferred images; and displaying the extracted target images that identify the need of the user.

2. The method of claim 1, further comprising:

after said displaying to the user images having at least one image for each of the plurality of the image categories, and receiving preferred images selected by the user among the displayed images, calculating a mean combination of a combination of prime keywords for a number of images that belong to each image category of the plurality of the image categories;

calculating a mean range for the prime keywords of images included in the mean combination;

removing images beyond the calculated mean range from the images included in the mean combination; and selecting a predetermined number of images from remaining images except the removed images.

3. The method of claim 2, wherein said displaying the extracted target image comprises:

extracting style keywords that are mapped to the mean combination; and extracting an image that has a style keyword similar to the extracted style keywords and matches the target keyword received from the user.

4. The method of claim 2, wherein said displaying the extracted target image comprises:

selecting a style keyword with a largest ratio among the style keywords that are mapped to the mean combination; and extracting an image that is mapped to the selected style keyword and matches the target keyword received from the user.

5. The method of claim 2, wherein said displaying the extracted target image comprises:

calculating ratios of style keywords that are mapped to the mean combination; and extracting an image relating to the target keyword received from the user in order of the ratios of the style keywords.

6. The method of claim 2, wherein said displaying the extracted target image comprises:

selecting prime keywords that are mapped to the mean combination; and extracting an image that has a prime score within a predetermined range of scores on the selected prime keywords and relates to the target keyword received from the user.

* * * * *